(12) United States Patent
Malher-Besse et al.

(10) Patent No.: US 9,580,676 B2
(45) Date of Patent: Feb. 28, 2017

(54) OENOLOGICAL PRODUCT COMPRISING COMPRESSED PIECES OF OAK WOOD AND A METHOD FOR PREPARING SUCH A PRODUCT

(71) Applicant: SEGUIN MOREAU & C°, Merpins (FR)

(72) Inventors: Nicolas Malher-Besse, Bordeaux (FR); Benoit Verdier, Gondeville (FR)

(73) Assignee: SEGUIN MOREAU & C°, Merpins (FR)

( * ) Notice: Subject to any disclaimer, the term of this patent is extended or adjusted under 35 U.S.C. 154(b) by 245 days.

(21) Appl. No.: 14/208,767

(22) Filed: Mar. 13, 2014

(65) Prior Publication Data

US 2015/0143998 A1   May 28, 2015

(30) Foreign Application Priority Data

Nov. 22, 2013  (FR) ..................... 13 61531

(51) Int. Cl.
| | | |
|---|---|---|
| *C12G 3/00* | (2006.01) | |
| *C12H 1/00* | (2006.01) | |
| *C12H 1/22* | (2006.01) | |
| *B27N 5/00* | (2006.01) | |
| *B27N 5/02* | (2006.01) | |
| *C12G 3/07* | (2006.01) | |
| *C12G 3/06* | (2006.01) | |

(52) U.S. Cl.
CPC ................. *C12H 1/22* (2013.01); *B27N 5/00* (2013.01); *B27N 5/02* (2013.01); *C12G 3/065* (2013.01); *C12G 3/06* (2013.01)

(58) Field of Classification Search
CPC ............. C12G 3/065; C12G 3/06; C12H 1/22
USPC .... 99/277.1, 277.2; 426/11, 422, 592, 330.4
See application file for complete search history.

(56) References Cited

U.S. PATENT DOCUMENTS

| | | | | |
|---|---|---|---|---|
| 5,343,913 | A * | 9/1994 | Tanahashi ................ | B27M 1/02 144/2.1 |
| 5,747,177 | A * | 5/1998 | Torimoto ............... | A63B 49/02 264/109 |
| 8,889,206 | B2 * | 11/2014 | Lix .......................... | B24C 1/04 217/88 |
| 2009/0162680 | A1 * | 6/2009 | Zheng ..................... | B27D 1/04 428/461 |
| 2011/0268838 | A1 * | 11/2011 | Vondrasek ............. | B65D 39/00 426/15 |

* cited by examiner

*Primary Examiner* — Reginald L Alexander
(74) *Attorney, Agent, or Firm* — Oliff PLC

(57) ABSTRACT

The present invention relates to an oenological product intended to be used in making wine or spirits. This product includes a piece of wood made of compressed pieces of oak wood.

7 Claims, 1 Drawing Sheet

Figure 1:
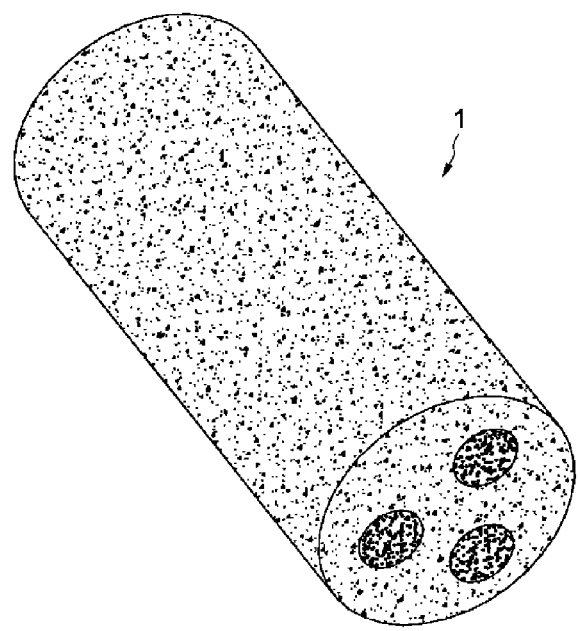

OENOLOGICAL PRODUCT COMPRISING COMPRESSED PIECES OF OAK WOOD AND A METHOD FOR PREPARING SUCH A PRODUCT

The invention relates to the general field of making wines and spirits.

More specifically, the invention relates to the use of pieces of oak wood in making wines and spirits, especially during aging and/or fermentation.

The use of pieces of oak wood is an oenological practice intended to add extractable oak wood compounds to wines and spirits to meet various oenological objectives. These may include enhancing fruity flavors, adding woody aromas or gaining in complexity, sweetness or tannic structure.

This technique was authorized in 2006 under the EU Regulation 1507/2006 dated 10 Jul. 2009 laying down legal oenological practices.

This technique is also an extension of the oaking phenomenon whereby wine is stored in oak barrels or casks where it takes on a woody taste.

In general, the use of pieces of oak wood is known to winemakers. In practice, they bring pieces of oak wood into contact with musts, wines or spirits using a variety of methods.

According to a first method, pieces of bulk oak wood, such as chips, are added directly into a tank containing must, wine or spirits.

The introduction of these pieces of bulk oak wood not only requires the opening of sometimes very heavy packaging bags, but also the manipulation of said pieces. These operations generate dust, making it more difficult to maintain strict hygiene requirements in modern winemaking cellars. Furthermore, this practice poses risks to the user's health, as dust is considered carcinogenic.

According to a second method, large-size pieces of oak wood are attached to each other before they are poured into the tank. In particular, staves, joined together with cables or mounted on supports, are introduced directly into a tank containing grapes.

The introduction of these pieces of wood requires hefty investments in equipment and manpower compared to the previous method.

In a third method, pieces of oak wood packaged in permeable packaging are dipped in wine. In particular, chips or blocks are introduced into brewing bags before they are poured into a tank.

The use of permeable packaging entails additional costs and may present a potential risk tied to the materials brought into contact with the processed product. As a matter of fact, bags used must comply with food standards in each user country.

The Applicant has found that with the introduction of pieces of oak wood in musts, wines or spirits in a compressed form, it becomes possible to address the above issues, in particular by facilitating their implementation and optimizing their cost of use.

The invention therefore relates to an oenological product to be used in making wines or spirits, comprising a piece of wood made of compressed pieces of oak wood.

According to another feature of the invention, the piece of wood comprises between 0.1 and 50 kg of compressed pieces of oak wood.

The product may for example be 1 to 100 cm long.

In one embodiment, the product is in the form of a cylinder, a brick or a wooden plank.

Compressed pieces of wood may be from oak trees of various origins. Advantageously, compressed pieces of oak wood are from French or American oak trees.

The invention also relates to a method for manufacturing an oenological product as defined above, wherein the pieces of oak wood are compressed at a pressure ranging between 500 and 2000 kg/cm$^2$.

The pieces of wood may also be compressed at a temperature ranging between 25 and 200° C.

Figure 2:
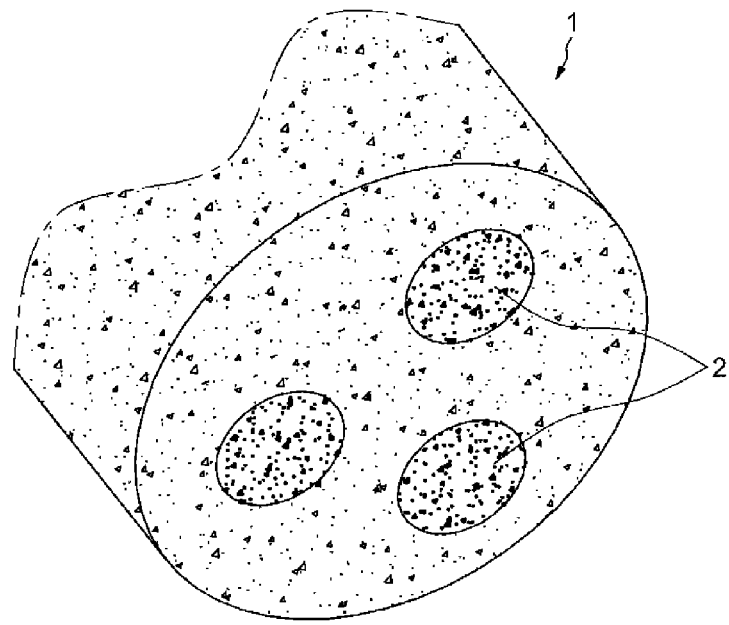

Other objects, features and advantages of the present invention will become more apparent upon reading the following description, given solely by way of example and with reference to the attached drawings in which:

FIG. 1 shows an example of the implementation of an oenological product according to the invention; and FIG. 2 is a view on a larger scale of the product in FIG. 1.

It should first be noted that the terms "between . . . and . . . " and " . . . to . . . " used herein shall be construed as including each of the mentioned limits.

Reference is made to FIGS. 1 and 2 which illustrate a mode of implementation of an oenological product according to the invention.

As can be seen, the product is here in the form of a cylindrical piece of wood 1. This part is made of pieces of wood, such as 2, in the form of powder, chips or pieces of greater size, compressed at a sufficient pressure to obtain cohesion of the pieces while allowing them to disintegrate when they come into contact with the processed product.

The product made of pieces of compressed oak wood is, in fact, intended to be introduced in musts, wines and spirits. When wood comes into contact with the liquid to be processed, the compressed pieces of oak wood disintegrate and are released into the liquid medium in particulate form in the appropriate particle size depending on the sensory profile sought by the user.

This step eliminates the disadvantages associated with the method of contacting pieces of bulk oak wood directly added in a tank containing the must, wine or spirits. Indeed, no dust is generated. Furthermore, hefty investments in specific equipment associated, on the one hand, with the use of large-size pieces of wood and, on the other hand, with the use of permeable packaging are no longer needed.

Once the particles are released into the liquid medium, oak wood compounds are extracted during the maceration of the pieces of oak wood in musts, wines and spirits over a period spanning between two and twelve months.

In particular, for a short period of time, typically about ten to fifteen days, the pieces of oak wood are brought into contact with the must before or during alcoholic fermentation. Solid particles, especially from pieces of oak wood, are removed when the fermented must is pressed.

For a long period of time, typically about six to ten months, the pieces of oak wood are brought into contact with wines and spirits during aging.

Furthermore, the contacting of the product according to the invention takes place before, during or after the alcoholic fermentation phase.

The nature and quantity of the oak wood compounds are influenced by several factors. First, we note that the product size varies greatly according to the oenological objective sought by the user. Preferably, the product is thus 1 to 100 cm long.

The origin of the product according to the invention is also a factor influencing the nature and quantity of the released compounds. Preferably, the compressed pieces of oak wood are from French or American oak trees.

The temperature of the pieces or more generally the temperature at which they are compressed is also a factor to be taken into consideration. For example, the temperature ranges between 25 and 200° C.

Finally, the quantity of the product according to the invention introduced, called the "dose", is also an important factor. In this respect, 0.5 to 20 g/L of products may be used.

To form the oenological product according to the invention, pieces of oak wood are compressed at a pressure between 200 and 2000 kg/cm$^2$ and, as before, at a temperature ranging between 25 and 200° C. The choice of pressure and temperature applied are intended to ensure the integrity of compressed pieces while facilitating their disintegration once introduced into the liquid medium.

Compression makes it possible to obtain, by the natural bonding, wood pieces thanks to the moisture released during the pressure build-up in the product according to the invention.

Achieving the oenological product may thus be obtained by introducing a predetermined mass of wood pieces in a press the chamber of which is chosen depending on the shape of the finished product. The pieces of oak wood may optionally be thermally pretreated, in particular by means of a heater in a convection oven, an infrared heater or fire heater.

After pressurization, the oenological product is thus obtained according to FIGS. 1 and 2. Such a product may be used directly and may be immersed in a tank during the making a wine or a spirit.

It should, however, finally be noted, as seen above, that the product may take on all forms, including the form of a log, a brick or a plank.

The invention claimed is:

1. An oenological product configured for making wines or spirits, wherein:
    said product comprises a piece of wood that encapsulates compressed pieces of oak wood; and
    the compressed pieces of oak wood are configured to be released into a liquid medium and broken in particulate form when interacting with the liquid medium.

2. The product according to claim 1 comprising between 0.1 and 50 kg of compressed pieces of oak wood.

3. The product according to claim 1, wherein said product is 1 to 100 cm long.

4. The product according to claim 1, wherein said product is in the form of a cylinder, a brick or a wooden plank.

5. The product according to claim 1, wherein said compressed pieces of oak wood come from French or American oak trees.

6. A method for preparing a product according to claim 1, wherein said pieces of oak wood are compressed at a pressure ranging between 200 and 2000 kg/cm$^2$.

7. A method according to claim 6, wherein said pieces of oak wood are compressed at a temperature ranging 25 and 200° C.

* * * * *